Feb. 19, 1957   D. H. RANSOM ET AL   2,782,323
PARALLEL OPERATION OF MOTOR-GENERATOR SET
Original Filed Jan. 30, 1951   2 Sheets-Sheet 1

INVENTORS
David H. Ransom
Fred Benjamin
BY
Philip S. Hilbert
ATTORNEY

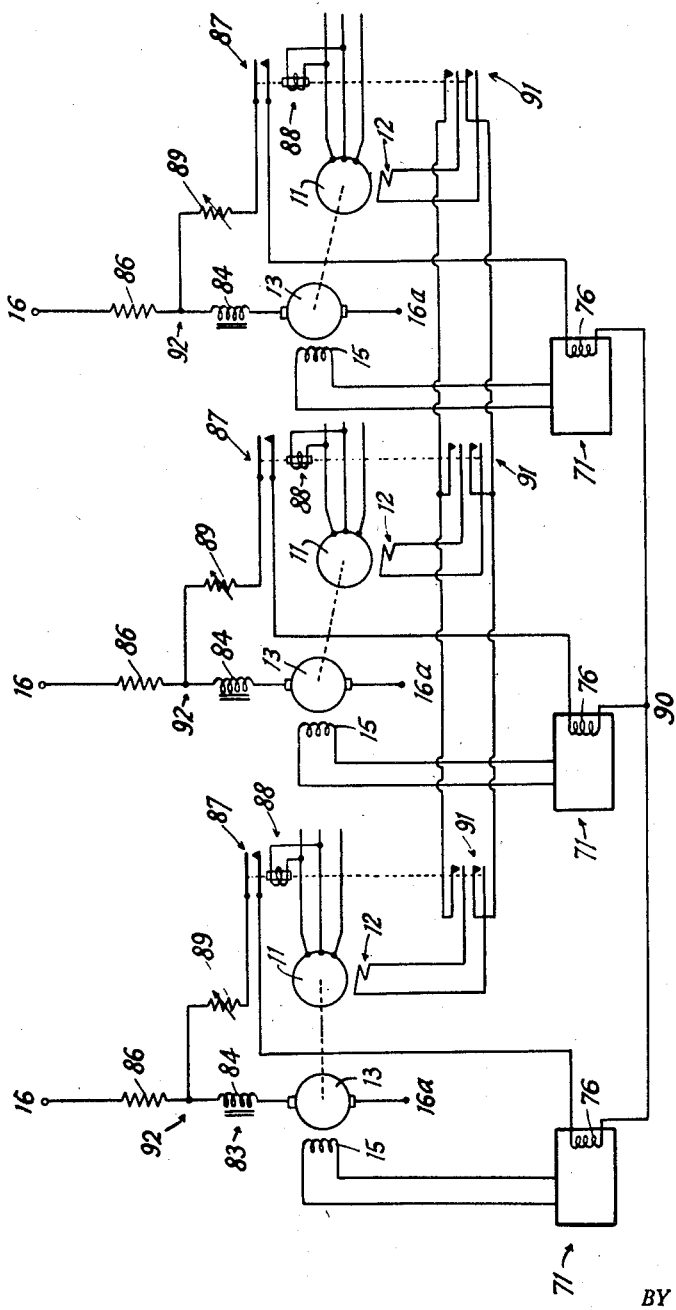
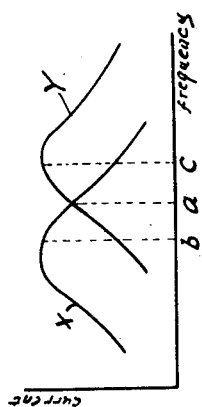
FIG. 3
FIG. 2
INVENTORS
David H. Ransom
Fred Benjamin
BY
*Philip S. Hilbert*
ATTORNEY

United States Patent Office 2,782,323
Patented Feb. 19, 1957

2,782,323

PARALLEL OPERATION OF MOTOR-GENERATOR SET

David H. Ransom, Pines Lake, and Fred Benjamin, Fair Lawn, N. J., assignors, by mesne assignments, to Reconstruction Finance Corporation, New York, N. Y., a corporation of the United States of America Original application January 30, 1951, Serial No. 208,554, now Patent No. 2,692,366, dated October 19, 1954. Divided and this application June 23, 1954, Serial No. 438,824

3 Claims. (Cl. 307—57)

This invention relates to magnetic voltage and speed regulators for motor generator sets.

An object of this invention is to provide motor generator systems with improved magnetic amplifier means for regulating the output voltage of the generator and the speed of the motor under conditions of variation in load and variation in the motor input voltage.

A further object of this invention is to provide in a motor generator system, improved magnetic amplifier means for automatically controlling the output voltage of the generator, such amplifier means having optimum operational characteristics at a predetermined frequency, together with means for regulating the speed of the motor to maintain such frequency.

Another object of this invention is to provide in a motor generator system, reactor means for sensing voltage fluctuations in the generator output, amplifying voltage deviations from a normal value and using the amplified voltage deviations to automatically compensate the system.

Still another object of this invention is to provide in a system of the character described, improved means for controlling the excitation of the generator field wherein the system is started with the field in open circuit, thereafter flashing the field from a direct current source having a wide range of voltages, and finally placing the field excitation under automatic control.

Still a further object of this invention is to provide in a system of the character described, wherein a plurality of motor generator sets may be operated in parallel through reactor means controlling the operation of the motors of the sets and reactor means controlling the output of the generators whereby the load is automatically and equally divided between the several sets.

Yet a further object of this invention is to provide in a system of the character described, improved means for sensing fluctuations in motor speed through deviations in the frequency of the generator output and using such deviations to vary the output of reactor means in circuit with a portion of the excitation system of the motor, thereby automatically controlling the speed of the motor and the frequency of the generator output.

Yet another object of this invention is to provide a motor generator set having a speed regulator including reactor means responsive to frequency changes in the generator output, for supplying motor excitation current, the motor excitation system including a shunt field and an auxiliary field arranged in opposed relation thereto, the reactor means being connected in circuit with the auxiliary field whereby a failure in output supplied to the auxiliary field will avoid a run away condition in the motor.

Still a further object of this invention is to provide in a system of the character described, an anti-hunt transformer in circuit with the motor and reactor means for dampening frequency changes and thereby preventing unwarranted oscillations in the system.

Still a further object of this invention is to provide in a system of the character described, a resistance in circuit with the motor shunt field for weakening the field when the motor is started and the generator field is in open circuit, together with switch means for automatically shunting the resistance when the generator field is energized under automatically controlled conditions.

Yet another object of this invention is to provide in a motor generator set, speed and voltage control means which is compact, requires no maintenance or replacement of parts, is rugged, and is efficient under varying conditions of operation.

This application is a division of application Ser. No. 208,554, filed January 30, 1951, now Patent No. 2,692,366, granted October 19, 1954.

Other objects of this invention will in part be obvious and in part hereinafter pointed out.

The invention accordingly consists in the combination of elements and interconnections therefor, which will be exemplified in the system hereinafter described, and of which the scope of invention will be indicated in the claims following.

In the drawing:

Fig. 2 is a coordinate diagram referring to the speed control portion thereof; and Fig. 3 is a circuit diagram showing multiple motor generator sets arranged for parallel operation.

Figure 1:
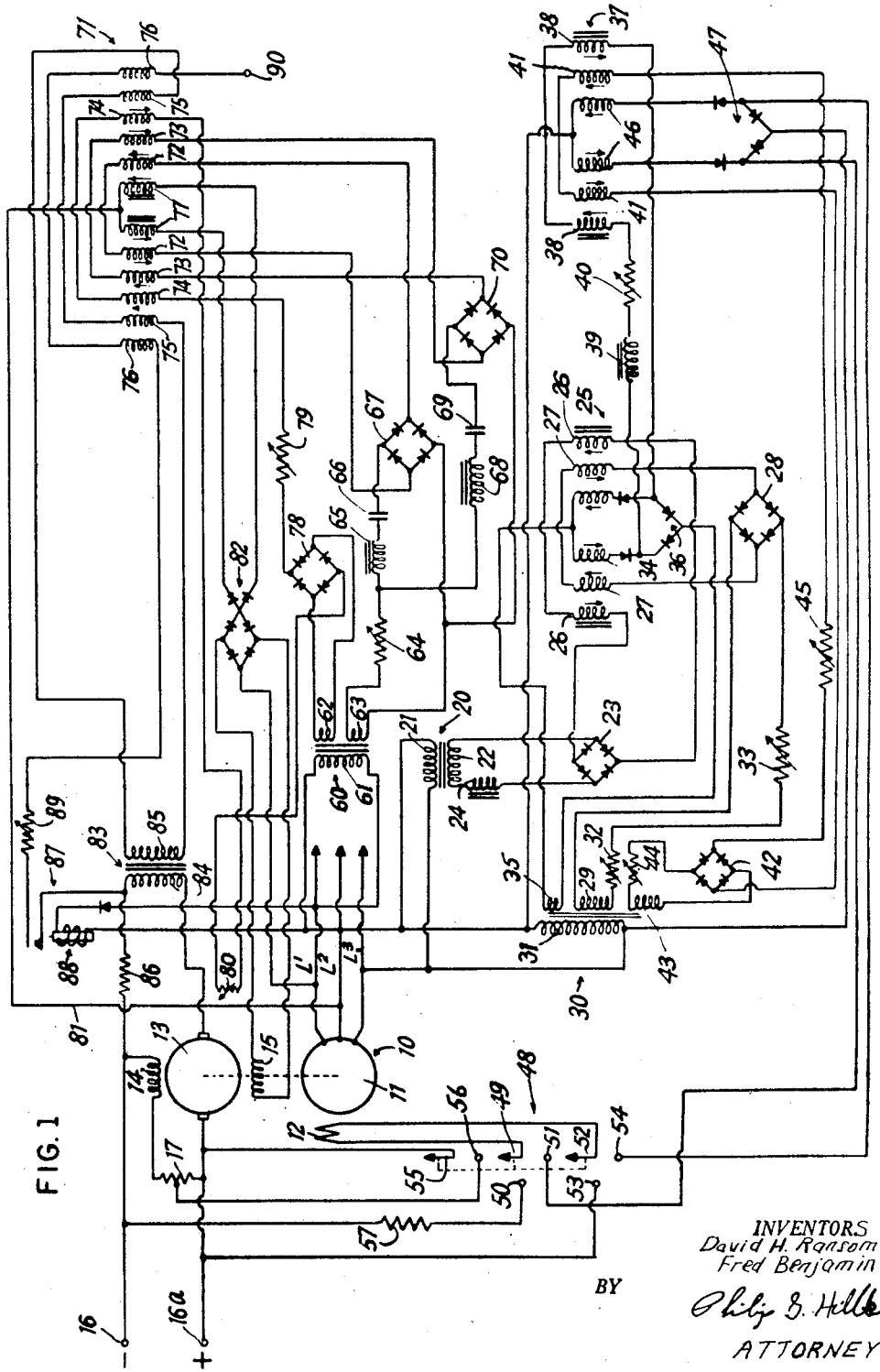
Fig. 1 is a circuit diagram of a motor generator set and speed and voltage controls therefor.

Referring in detail to the drawings and particularly to Fig. 1, 10 designates a polyphase alternating current generator having an armature 11 and a field 12. Such a generator is driven by a direct current motor 13 having a shunt field 14 and an auxiliary field 15. The field 15 is arranged in opposed or bucking relation to field 14 for the purpose hereinafter appearing. Current for motor 13 may be supplied from terminals 16, 16a of a suitable source of direct current which may have a voltage range in which the maximum value may be as much as twice the minimum value and which may vary continuously between such minimum and maximum values. A resistor 17 is connected in series with shunt field 14, for the purpose hereinafter appearing.

Means is provided for automatically regulating the voltage of the generator output as distributed to power lines $L_1$, $L_2$, $L_3$. Such means includes a voltage detection system which comprises a transformer 20 having a primary winding 21 connected across lines $L_2$, $L_3$, and a secondary winding 22 connected to the input side of a bridge rectifier 23, through a non-linear voltage sensing reactor 24. The reactor 24 is adapted to produce a substantial change in the current supplied to rectifier 23 in response to a relatively small change in voltage across phases of the generator output.

The output of rectifier 23 is supplied to reactor means 25 forming a first of two stages of amplification. The reactor means 25 comprises a pair of series connected control windings 26 disposed on a suitable magnetic core and connected in circuit with the output of rectifier 23. The reactor means 25 further comprises a pair of series connected bias windings 27 also disposed on said core and connected in circuit with the output side of a full wave rectifier 28. The input for rectifier 28 is supplied from a secondary winding 29 on a transformer 30. The primary winding 31 on transformer 30 is connected across lines $L_2$, $L_3$. Series connected resistors 32, 33 are connected between the transformer winding 29 and the input side of rectifier 28 for controlling the current supplied to bias windings 27.

The reactor 25 further comprises a pair of parallel connected power windings 34 also disposed on said core and energized from a second secondary winding 35 on transformer 30. A set of bridge connected rectifiers 36 in circuit with the power windings 34 provide self saturation and also rectify the output of the first stage of amplification. Such output is supplied to a second reactor means 37 which forms a second stage of amplification.

The reactor means 37 includes a pair of series connected control windings 38 on a suitable magnetic core, which are connected in circuit with the output side of rectifiers 36 through a series connected reactor 39 and resistor 40. The reactor 39 and resistor 40 provide means for filtering the current between amplification stages and help to stabilize the overall system.

The reactor means 37 further includes a pair of series connected bias windings 41 which are energized by the output of a full wave rectifier 42, whose input is supplied by a third secondary winding 43 on transformer 30. Resistors 44, 45 serve to regulate the current supplied to bias windings 41.

The reactor means 37 also includes a pair of parallel connected power windings 46 which are directly energized from power lines $L_2$, $L_3$. A group of bridge connected rectifiers 47 in circuit with the power windings 46 supply self saturation for the reactor means and also rectify the output of the second stage of amplification for supply to the generator field 12.

In operating the system, the resistors 32, 33; 44, 45, are set to provide a predetermined output-input characteristic for the reactor means 25, 37, respectively and thereby determining an operating voltage for the output of generator 10. A plus deviation in the generator voltage, will produce an increase in the input to the voltage detection system, which will in turn cause an increase in the input and output of the first stage of amplification, inasmuch as the windings 26, 34 of reactor means 25, are poled to provide fluxes in the same direction, as indicated by the arrows.

The windings 38, 46 of reactor means 37 are poled to provide fluxes in opposite directions, as indicated by the arrows. Accordingly, the input to reactor means 37 produces a decreased output which is supplied to the generator field 12. Such decrease in field excitation is sufficient to effect a decrease in the generator output voltage of an order to restore the output voltage to the desired operating voltage.

Conversely, a decrease in generator output voltage will be sensed by reactor 24 to provide an input for the reactor means 25 which will result in a decreased output. Such output supplied to the reactor means 37 will produce an increased output therefrom which is supplied to the generator field and automatically raises the voltage to the desired operating value.

It is understood that the order of inversion of outputs between reactors 25 and 37, may be reversed. In such case, the first reactor means will invert the voltage deviation sensed by reactor 24 whether it is plus or minus and the second reactor means will amplify the output of the first reactor means and supply the voltage correcting factor to the generator field.

Switch means is provided for controlling the current input to the generator field 12. Such means may take the form of a rotary type snap switch 48. The switch 48 includes a movable contact 49 for engaging fixed contacts 50, 51; a movable contact 52 for engaging fixed contacts 53, 54 and a movable contact 55 for engaging fixed contact 56. The movable contacts 49, 52 are in circuit with the generator field 12. The fixed contacts 50, 53 are connected to a source of direct current which may be the same as that applied to terminals 16, 16a. A resistor 57 is inserted in the lead connected to contact 50. Fixed contacts 51, 54 are connected in circuit with the output of reactor 37 by connection to the output of rectifier 47.

The motor 13 is started with the switch 48 open as shown in Fig. 1, thus leaving the generator field 12 in open circuit while the generator armature is rotated, and there is no generator output. The switch 48 is then operated with a snap action, causing contacts 50, 53 to be only momentarily engaged so as to flash the generator field from the direct current source as from terminals 16, 16a. The switch 48, with the single operating motion, passes the field into direct connection with the output of the voltage regulating system.

The snap acting switch 48 prevents direct current from terminals 16, 16a, from being applied to the generator field for more than a fraction of a second. Accordingly, though the voltage at terminals 16, 16a may be at a maximum value, there will be no harmful effects in respect to the generator and its regulator components. Furthermore, the resistor 57 may be of a relatively small rating with respect to the power passed thereby, inasmuch as the current flow therethrough is of such short duration.

The voltage regulating system above described is sensitive to frequency changes, the reactor 24 having its optimum operating characteristics at a predetermined frequency. Accordingly, means is provided for regulating the speed of motor 13 in order to maintain such predetermined frequency in the system.

Such means comprises a frequency sensing system including a transformer 60 which has its primary winding 61 connected to lines $L_2$, $L_3$. The transformer 60 includes a pair of secondary windings 62, 63, wherein winding 63 is connected in circuit with a low frequency tuned section and a high frequency tuned section, through a resistor 64.

The low frequency tuned section comprises a series connected reactor 65 and capacitor 66 arranged in circuit with the input side of a full wave rectifier 67 and the transformer winding 63. The high frequency tuned section comprises a series connected reactor 68 and capacitor 69 arranged in circuit with the input side of a full wave rectifier 70 and the transformer winding 63.

The output of rectifiers 67, 70 is supplied to a reactor means 71 which comprises a suitable magnetic core on which is disposed a plurality of pairs of series connected windings 72, 73, 74, 75, 76 and a pair of parallel connected windings 77.

Winding 62 on transformer 60 supplies current to the input side of a full wave rectifier 78, whose output is supplied to windings 74 through resistors 79, 80, and provides bias current for adjusting the input-output charactereistics of the reactor means.

Windings 77 are connected at their juncture to power line $L_2$, by means of conductor 81. The windings 77 are connected in circuit with the input side of rectifier 82 and the power line $L_1$. The output of rectifier 82 is connected in circuit with the auxiliary field 15 of motor 13. The windings 72 are connected to the output of rectifier 67 and the windings 73 are connected to the output of rectifier 70.

The windings 73 are poled to provide a flux which is in the same direction as that of bias windings 74 and in the opposite direction as that of the power windings 77; while windings 72 are poled to provide a flux which is opposite in direction to that of bias windings 74 and in the same direction as that of power windings 77, as indicated by the arrows in the drawing.

The transformer winding 63 is adapted to sense frequency changes in the generator output from a normal operating frequency. The low and high frequency sections are adapted to be responsive to output frequencies lower and higher, respectively than said operating frequency, in accordance with the curves $x$, $y$, respectively shown in Fig. 2, where the respective current outputs are plotted against the frequency of the input.

Assuming that the normal operating frequency of the generator output is of a value indicated at the point $a$ on the diagram of Fig. 2, then with the generator operating at such frequency, there will be no resultant ampere turns as between the low and high frequency sections, to be supplied to the reactor means 71.

Further assuming that the frequency of the generator output decreases below the normal operating frequency to a value corresponding to point b on the diagram, then it will be seen that there will be an increase in current from the low frequency section while at the same time there will be a decrease in current from the high frequency section. The increased current from the low frequency section is supplied to windings 72 which aid the power windings 77 while the decreased current from the high frequency section is supplied to the windings 73, thereby decreasing the bucking action of windings 73 in respect to power windings 77. Accordingly, the action of both the low and high frequency sections will be to cause an increase in the output of reactor 71. The increase in reactor output is supplied to the auxiliary motor field 15 which is in bucking relation to the shunt field 14, thereby producing a decrease in the total field excitation. Such decrease in field excitation will be in an amount causing the motor 13 to increase its speed sufficiently to restore the frequency of the generator output to its normal operating value.

It is also apparent that if the generator output frequency should increase above the operating frequency, to a value corresponding to point c on the diagram of Fig. 2, then the current output of the high frequency section which is supplied to windings 73, will be increased while the current output of the low frequency section which is supplied to windings 72 is decreased. With the flux of windings 73 in opposition to that of the power windings 77, the output of the reactor 71 will be decreased and the aiding effect of windings 72 relative to windings 77 will be reduced due to the decreased output of the low frequency section. Accordingly, the decreased output of the reactor 71 supplied to the auxiliary field 15 will result in an increase in the total field excitation, thereby decreasing the motor speed to restore the frequency of the generator output to a normal value.

Means is provided for dampening frequency changes and thereby prevent oscillations of the regulating system. To this end, there is provided a transformer 83 having a primary winding 84 connected in series with the armature of motor 13, and a secondary winding 85 connected in circuit with windings 75 of reactor means 71. The windings of transformer 83 are poled to oppose flux changes in the reactor means 71 and slow down the action of the reactor means.

In starting the motor generator system by means of the snap action switch 48, it will be noted, that initially the contacts 55, 56 of the switch are open, whereby current applied to terminals 16, 16a, must traverse the entire resistor 17 which is in series with the shunt field 14. At this time the generator field 12 is deenergized but the resistor 17 weakens the motor field and brings the motor near rated speed during starting. However, when switch 48 is operated to energize the generator field and to place the same under automatic control of the reactor means, switch contacts 55, 56 are closed and are effective to eliminate most of the resistor 17 from the motor field circuit at the same time that automatic regulation of the motor speed becomes effective through reactor means 71.

The regulated operating frequency of the motor 13 may be varied by suitable adjustment of resistor 80 which controls the current supplied to windings 74 of reactor means 71. A decrease in current supplied to said windings will have the effect of increasing the output of the reactor means and thereby increasing the speed of the motor. An increase in current supplied to the windings 74 will be effective to decrease the speed of the motor.

Means is also provided for connecting a plurality of similar motor generator sets for parallel operation, as shown in Fig. 3. To this end, each motor 13 has a low loss resistor or shunt 86 connected in series with the motor armature. One side of windings 76 on reactor 71 is connected between resistor 86 and transformer winding 84. Switch contacts 87 of a relay 88 and a resistor 89 series connected therewith, are inserted in this connection. The other side of windings 76 in each reactor means is brought together at a common connection as at 90. The relays 88 may be energized from the output of the generator 10 through suitable rectifiers.

When two or more motor generator systems are to be operated in parallel, the closing of switch contacts 91 on relay 88 will throw all the generator fields 12 into parallel connection and thereby suppress cross currents between generators. The simultaneous closing of switch contacts 87 will provide windings 76 of the reactors 71 with current produced by the difference of potential of junction points 92 located between resistors 86 and transformer windings 84, the current direction and magnitude of each depending only on the magnitude of these potentials.

The potential of junction points 92, established by resistors 86, is proportional to motor armature currents and therefore proportional to generator loads. With balanced loads and therefore equal potentials at junction points 92, there will be no current flowing in windings 76. With unbalanced loads, currents passing through windings 76 will be in such direction as to correct the output of each reactor means 71 in a manner as to balance once again the division of load between the several motor generator sets.

It is apparent that with a motor excitation system comprising an auxiliary field in opposing relation to a shunt field, there is no danger of a run away condition in the event that there should be a failure of output from the reactor 71.

In the event that the motor generator sets which are to be interconnected for parallel operation, are of different full load ratings, resistors 86 will have values such that the potential of junction points 92 is equal when the loads between generators are divided in proportion to their full load ratings.

It will thus be seen that there is provided a magnetic voltage and speed regulator in which the several objects of this invention are achieved and which is well adapted to meet conditions of practical use.

As various possible embodiments might be made of the above described invention, and as various changes might be made in the embodiment set forth, it is understood that all matter herein set forth or shown in the accompanying drawing, is to be interpreted as illustrative and not in a limiting sense.

Having thus described our invention, we claim as new and desire to protect by Letters Patent:

1. In a system including a plurality of motor generator sets adapted to be connected for parallel operation wherein the motor of each set comprises an auxiliary field, circuit means for connecting the fields of the respective generators in parallel, speed regulating means for each set including reactor means comprising a control winding, circuit means connecting the output of each reactor means with the field of the motor associated therewith, means in circuit with the armature of each motor for establishing a potential proportional to the load of the generator associated therewith, a common circuit interconnecting the control winding of each of said reactor means and the potential establishing means of each motor whereby an unbalance in the generator loads is operative to provide a control current in said common circuit of a magnitude and in a direction to modify the outputs of the reactor means to correspondingly adjust the speed of the motors respectively associated therewith and thereby restore the balance of load between the generators.

2. In a system as in claim 1 wherein each of said potential establishing means comprises a resistor in series with a motor armature, and said common circuit includes circuit means interconnecting one side of each of said control windings, and circuit means connecting the other side of each control winding to a point between the resistor and the armature of the motor associated therewith.

3. In a system as in claim 1 and further including switch means in circuit with each of said resistors and the control winding associated therewith and relay means in circuit with the output of each generator for operating the switch means associated therewith.

References Cited in the file of this patent
UNITED STATES PATENTS 1,945,831    Stansbury _____ Feb. 6, 1934